Patented July 28, 1942

2,291,588

UNITED STATES PATENT OFFICE 2,291,588

METHOD OF HYDROCARBON CONVERSION

Vladimir A. Kalichevsky and George F. Hornaday, Woodbury, N. J., assignors to Socony-Vacuum Oil Company, Incorporated, New York, N. Y., a corporation of New York No Drawing. Application December 22, 1939, Serial No. 310,569

1 Claim. (Cl. 196—52)

This invention is directed to improvements in vapor phase catalytic cracking resulting in significant and marked changes in the properties of the products arising therefrom.

This invention is particularly directed to those processes of vapor phase catalytic cracking wherein the material to be cracked is passed over a catalytic mass of a clay-like nature, such as, for example, a mixture of alumina and silica. Such processes are fully explained in the various United States patents of Eugene Houdry and associates.

In short the method of cracking is one in which a petroleum oil, heated to about 850° F. in the vapor form, is passed at that temperature through a space containing a contact mass composed of particles, pellets, or granules consisting of alumina and silica, having the nature of a hydrated aluminum silicate. The vapors, in passage through said mass are converted to a large extent to material of gasoline boiling range, of desirable high octane value, a portion of the material remaining unchanged and of properties essentially the same as the charge. The remainder of the charge is converted into gaseous hydrocarbons and into a small amount of cokey material which remains upon the contact mass and is periodically burned off by a regeneration which may be in situ.

The material which is used as a catalyst appears to be possessed of a physical capability of promoting reaction instead of a chemical capability and this ability is distributed in varying degrees through wide variety of materials, natural, partially processed, and synthetic, which in general are of the clay type, comprising in their composition alumina, silica, or both, such as fuller's earth, "Filtrol" clays, bauxite, silica gel, naturally occurring adsorbent clays generally related to fuller's earth, acid washed adsorbent clays and other partially processed clays, and many synthetic aluminates, silicates, and mixtures thereof.

The material which passes through the reaction zone apparently without substantial change is known as "recycle" stock. This invention has specifically to do with a modification of the operation which produces unexpected and marked changes in this recycle stock.

As pointed out previously, the normal recycle stock is a gas oil, not unlike the original charge in physical properties. For example in an operation conducted at 875° F. and 30# per square inch gauge pressure, to produce about 32% of gasoline of 400° F. end point and about 58% of recycle stock from a charging stock which in turn was a recycle stock derived from one similar treatment of gas oil from Oklahoma City crude, the properties of the charge and of the recycle stock produced therefrom were as follows:

Table I

|  | Charge | Recycle stock |
|---|---|---|
| Gravity, °API | 33.4 | 30.8 |
| Pour, °F | 15 | 10 |
| Aniline No., °F | 162 | 137 |
| Sulphur, percent wt | 0.16 | 0.18 |
| Flash (P. M.), °F | 224 | 214 |
| Carbon residue, percent wt | 0.03 | 0.09 |
| B. S. & W., percent vol | 0.02 | Trace |
| S. U. visc. @ 100° F., sec | 41.3 | Less than 39 |
| Cetane number | 55 | 46 |
| Distillation ASTM °F: |  |  |
| I. B. P | 433 | 438 |
| 5% | 495 | 470 |
| 10% | 511 | 480 |
| 20% | 532 | 497 |
| 30% | 547 | 512 |
| 40% | 562 | 524 |
| 50% | 578 | 542 |
| 60% | 592 | 558 |
| 70% | 608 | 578 |
| 80% | 626 | 598 |
| 90% | 650 | 627 |
| EP | 707 | 676 |
| Rec. percent | 99.0 | 98.0 |
| Res. percent | 1.0 | 2.0 |

This invention is based upon the discovery that unexpected and marked results flow from the introduction of small amount of halogens, particularly gaseous chlorine into the stream of vapors entering the catalytic mass. Without substantial change in the yields of either gasoline or cycle stock, and without substantial change in the nature of the gasoline produced, marked changes in the viscosity of the recycle stock are observed. For example, when introducing into the charge of the above operation 0.2% by weight of chlorine, the viscosity of the recycle stock is increased about threefold. Also, there are brought about significant increases in the cetane number of the recycle stock. It is quite obvious to those skilled in the art that this affords an avenue for the treatment of hydrocarbons of great potential value, particularly when it is remembered that it is coupled with a type of cracking of advanced capabilities. To show the effect of this operation, Table II contrasts the newly produced recycle stock with the previously mentioned normal recycle stock.

Table II

|  | Normal recycle stock | Recycle stock produced using 0.2% (wt.) chlorine |
|---|---|---|
| Gravity, °API | 30.8 | 30.9 |
| Pour, °F | 10 | 15 |
| Aniline No., °F | 137 | 141 |
| Sulphur, percent wt | 0.18 | 0.21 |
| Flash (P. M.) °F | 214 | 224 |
| Carbon residue, percent wt | 0.09 | 0.07 |
| B. S. & W., percent vol | Trace | Trace |
| S. U. visc. @ 100° F. sec | Less than 39 | 100.1 |
| Cetane number | 46 | 51 |
| Distillation ASTM °F: |  |  |
| I.B.P | 438 | 443 |
| 5% | 470 | 486 |
| 10% | 480 | 497 |
| 20% | 497 | 508 |
| 30% | 512 | 520 |
| 40% | 524 | 532 |
| 50% | 542 | 546 |
| 60% | 558 | 564 |
| 70% | 578 | 578 |
| 80% | 598 | 600 |
| 90% | 627 | 628 |
| EP | 676 | 686 |
| Rec | 98.0 | 98.0 |
| Res | 2.0 | 2.0 |

We claim:

That method for the conversion of petroleum hydrocarbons comprising vaporizing hydrocarbons of high boiling point, superheating said vapors and passing them while so superheated through a claylike catalyst mass to accomplish a substantial cracking of the high boiling hydrocarbons to hydrocarbons of low boiling point of the nature of gasoline wherein a small amount of chlorine is added to said vapors prior to contact with said catalyst, producing a normal amount of uncracked high boiling hydrocarbon which is substantially increased in viscosity while remaining otherwise substantially unchanged, and removing a portion at least of said uncracked high boiling hydrocarbon as a product of the process.

VLADIMIR A. KALICHEVSKY.
GEORGE F. HORNADAY.